Sept. 20, 1960  R. L. WALL  2,953,697
MAGNETIC CORE FOR DYNAMOELECTRIC MACHINES
Filed Dec. 30, 1958
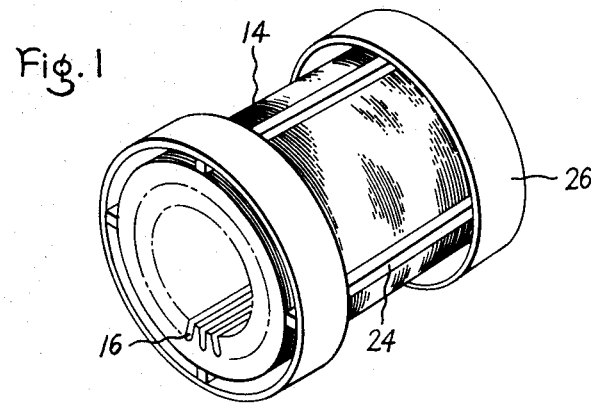
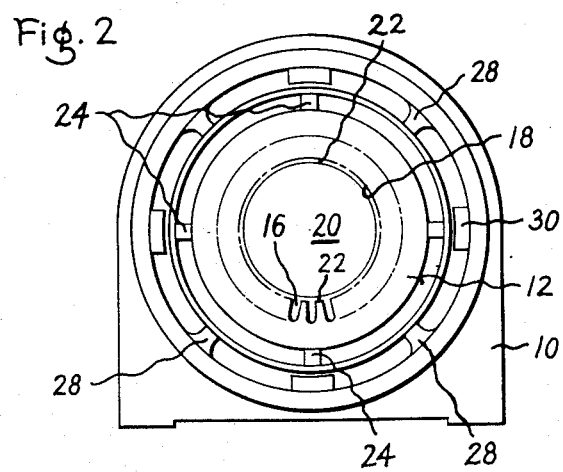
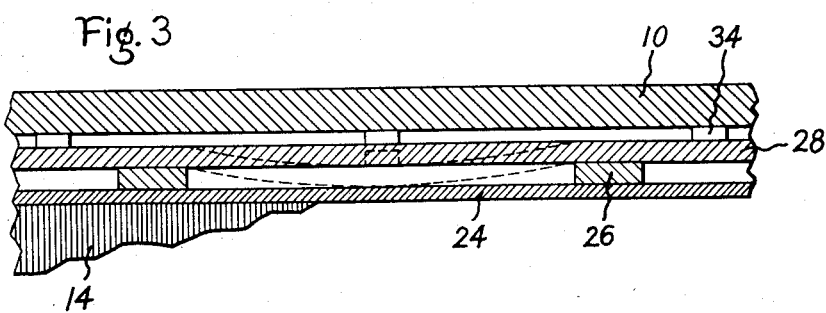
Inventor:
Robert L. Wall
by James R. Campbell
His Attorney

United States Patent Office 2,953,697
Patented Sept. 20, 1960

2,953,697

MAGNETIC CORE FOR DYNAMOELECTRIC MACHINES

Robert L. Wall, Ballston Lake, N.Y., assignor to General Electric Company, a corporation of New York Filed Dec. 30, 1958, Ser. No. 783,746

4 Claims. (Cl. 310—51)

The invention described herein relates to dynamoelectric machines and more particularly to an improved arrangement for minimizing and reducing the level of sound noises emanated by stator cores during operation of the machine. The invention is directed primarily to those vibratory noises resulting from stator core distortion caused by a rotating magnetic field linking the electrodynamic cooperating parts.

In operation of a dynamoelectric machine, the stationary member or stator core is linked by a magnetic field established in the rotating member or by currents in the stator core winding. The force created by the field flux between the stator and rotor cores is concentrated at the poles and produces a stress at the point of flux concentration to cause physical distortion of the stator core with consequent vibration thereof, which ultimately manifests itself in the form of a noise, either air-borne or structure-borne. It is particularly noticeable in two-pole machines wherein excitation provides two magnetic poles which rotate around the stator. At any instantaneous moment, the forces attracting the stator to the rotating member are at a maximum near the poles and a minimum 90 mechanical degrees away which causes elliptical or four node distortion of the core. As the field rotates, a point on the stator core is alternately and rapidly drawn toward and forced outwardly from the rotor. The physical effect is that the rotating elliptical distortion of the core produces two vibrations at any fixed point for each revolution of the field, thus producing a noise. Therefore, the stator core is caused to vibrate at a frequency twice the speed of the field. In those instances where the frame is directly attached to the outer peripheral surface of the stator core, it is caused to vibrate at the same frequency as the core. Although, measurement of the core distortion or displacement would show changes of small magnitude, the forces generated as a result of the distortion are capable of imparting a pressure wave of large magnitude to the atmosphere at a frequency which is audible. Also, the supporting foundation and connected driven equipment are subjected to the same vibrating frequencies which is undesirable, not only from a noise standpoint but also because the rapid and successive application of stress to the parts may fatigue the material thus creating weak areas where strength is most needed.

The irregularities in the magnetic field produced by the slot interruptions in the iron of the rotor and stator surfaces, also create forces that cause additional vibrations which result in noises of higher frequency tones. These forces may be geenrated by magnetic fields having a large number of poles resulting in distortion of more complicated geometrical configurations. The many variations in slot combinations and speeds further makes the problem of sound treatment even more complicated.

Considerable attention has been directed toward isolating and damping these vibrations in turbogenerators of large diameter having stator cores of greater flexibility than small machines. The concentration of flux at the poles in the air gap between the rotor and stator of turbogenerators produces large vibrations in the core. When these vibrations are transmitted to the frame their amplitude may be of sufficient size to cause structural fatigue of the frame and any connected parts. However, the isolation of such vibratory forces in large machines is generally for the purpose of preventing distortion of parts and the various constructions resorted to for minimizing the likelihood of cracking or other failure of the frame is not applicable to as great an extent in small machines. Since dynamoelectric machines are subjected to forces causing vibration at resonant frequencies, the designer has the further problem of preventing the magnetic frequencies from coinciding with the mechanical resonant frequencies occurring in the parts. Moreover, the constructions used for treatment of the vibrations existing in large machines are necessarily expensive because of the need for protecting the initial investment. Also, the construction utilized for minimizing noise occupies considerable space, which in the case of the small motor and generator, usually is at a premium. These and other problems associated with the reduction of vibrations transmitted from a stator core to the frame have been dealt with in the past, but as far as known, particular attention has not been directed to the smaller size motors and generators which has had for its object the minimizing of air-borne and structure-borne sound noises radiated by the machine.

The primary object of my invention is to provide a simply designed and economical structure capable of absorbing the vibrations emitted by a vibrating core and for preventing their transfer to the foundation or to a frame used for supporting the core in the machine.

In carrying out my invention, I minimize the transmission of vibratory forces from a stator core to its frame or foundation by welding or otherwise attaching metal lugs longitudinally to the outer peripheral surface of the core laminations. A pair of spaced rings concentric with the core are attached to the outer lug surfaces in a manner to impart stiffness to the ring tangentially while permitting radial flexibility so that deflection or deformation thereof is allowed when the stator core is deformed to an elliptical or more complex geometrical configuration. In order to support the core in a housing, the rings are secured to the frame at points equidistant of the lugs and through the intermediary of bars which are individual to each ring or may extend the complete length of the core. Snubbers are provided on the internal surface of the frame and are positioned opposite from the lugs for preventing the stator core from being distorted in an amount sufficient to allow the rotor surface to engage the stator. Forces capable of causing this unwanted action could occur in the machine or be exterior thereto, as when an installation including the machine is subjected to shock.

While the specification concludes with claims particularly pointing out and distinctly claiming the subject matter which I regard as my invention, it is believed the invention will be better understood from the following description taken in connection with the accompanying drawing in which:

Figure 1 is a perspective view of a stator core illustrating the disposition of lugs and rings attached to its outer peripheral surface; and Figure 2 is a view in elevation showing how the apparatus of this invention is position between the frame and the stator core.

Figure 3 illustrates a modification.

Referring now to the drawing wherein like reference characters designate like or corresponding parts throughout the several views, there is shown a frame 10 supporting a stator 12 comprising a plurality of laminations 14 having coil receiving slots 16 disposed therein. The slots are of conventional design and are arranged for receiving the coil conductors in a well known manner. The stator bore 18 is of a size sufficient to accept a rotor 20 arranged for electrodynamic cooperation therewith. As described previously, during operation of the machine, magnetic flux produced by the poles is concentrated in the air gap, such as at points 22, during an instantaneous period of time. The flux has the effect of drawing the stator core inwardly towards the rotor in those areas where the flux density is at its greatest, while that area not exposed to flux is permitted to deform outwardly, thus forming an ellipse. Since flux reversal takes place every 1/60 of a second with 60 cycle line voltages, and by virtue of the fact that the field rotates, every flux reversal will cause the stator core to assume the elliptical configuration previously mentioned. Although the degree of distortion is so small that it is not visible to the eye, the speed with which it occurs and the intensity of movement is sufficient to cause air in contact therewith to be subjected to an alternating pressure at a frequency equal to twice the field speed. This frequency falls within an audible range and therefore can be heard as a pure tone noise. In those cases where the frame is in intimate contact with the peripheral surfaces of the core, the frame likewise is caused to vibration at exactly the same frequency as the core. Also the frame is caused to vibrate at higher frequencies due to dissymmetries in the rotor and stator peripheral surfaces as represented by the conductor slots.

In order to reduce the sound level of noise caused by the vibrating frame, a plurality of lugs 24 comprising solid steel bars are welded longitudinally on the outer peripheral surface of the core laminations 14. Welded or otherwise affixed to the outer surface of the lugs and in concentric spaced relationship with the stator core are a pair of rings 26 also made of steel or other flexible material. This unit is positioned within the frame 10 but is spaced therefrom by a plurality of bars 28 which are spaced between the lugs 24 in a peripheral direction but extend the full length of the machine. Also, at spaced intervals around the core periphery and opposite from the lugs 24 are a number of snubbers 30, made of rubber, steel, iron or other elastic material for absorbing any vibrations which may be transmitted to the metal frame housing.

In the embodiment illustrated, it will be evident that during operation, any distortion of the stator core results in vibrations which are transmitted through the lugs 24 to the concentric rings 26. Since these rings are stiff in a tangential direction, but flexible radially, it will be apparent that the vibrating forces will cause the affected portions of the rings 26 to deflect radially and thereby absorb and dampen to a substantial degree the vibratory forces from the stator core. Some of the vibrations find their way from the rings 26 into the frame 10 of the machine by way of bars 28, but the amplitude of the frequencies are diminished to such a great extent that the frame is not placed in vibration, or if vibration exists, the amplitude of the sound frequencies is so small that they are not audible. Also, when excessive distortion of the stator core occurs, some of the force imparted to the ring can be absorbed by the snubbers 30 which are located in a position immediately opposite from the lugs 24.

In a modification, the bars 28 which extend the length of the stator core, are spaced from the frame by a number of spacing members 34 positioned axially outwardly from the rings 26. Preferably, the bars 28 are welded or otherwise affixed to the outer surface of the rings. During operation, vibratory forces represented by frequencies of large amplitude, are transmitted from the core 12 through the lugs 24 to the rings 26, which effectively serve to reduce the amplitude of the vibrations prior to being delivered to the frame. The structure of this modification envisions an ancilliary vibration damping system by permitting the vibrations to enter the bars 28 which also are of sufficient flexibility for reducing the amplitude of the sound frequencies. As illustrated in Figure 3, the bars 28 are designed to allow movement in a radial direction also, with the area between the core and the frame providing a free space for accommodating bar movement.

Obviously many modifications and variations are possible in light of the above teachings. For example, the bars, lugs and rings may be made out of any material that has flexible properties comparable with steel and still can be welded or otherwise fixed to the stator core periphery. Although only four lugs 24 have been shown as extending longitudinally of the core, it will be evident that a greater or lesser number may be used. If desired, the lugs may be terminated in that intermediate portion existing between the rings. The rings need not be completely closed and they may be spaced at intervals along the core length. The length of the stator core in some machines is of sufficient length to require more than two rings, and in these instances, a number of rings may be installed intermediate the core length. Since the primary inventive concept is that of providing rings stiff in a tangential direction but flexible radially, a ring of helical configuration may be located between the two outer rings, or the helical-shaped ring may extend completely from one end of the core to the other. It therefore is to be understood that within the scope of the following claims, the invention may be practiced otherwise than as specifically described.

What I claim as new and desire to secure by Letters Patent of the United States is:

1. A magnetic core for a dynamoelectric machine comprising a plurality of laminations having coil receiving conductor slots therein, a plurality of supports attached to the outer peripheral surface of the core and extending the length thereof, flexible members displaying tangential stiffness and radial flexibility attached to said supports, and means enclosing said core with its attached ring in spaced relationship with a supporting frame so that vibrations appearing in the stator core as a result of deformation thereof are transmitted through said supports to the flexible members wherein the vibratory forces are attenuated.

2. A magnetic core for a dynamoelectric machine comprising a plurality of laminations having conductor receiving slots therein, a plurality of force transmitting members attached to the outer peripheral surface of the core and extending longitudinally thereof, concentric rings displaying tangential stiffness and radial flexibility attached to said supports and spaced along the axial length of the core, and means enclosing said core with its attached ring in spaced relationship with a supporting frame so that vibrations appearing in the stator core as a result of deformation thereof are transmitted through said supports to the flexible members wherein the vibratory forces are dissipated.

3. A magnetic core for a dynamoelectric machine comprising a plurality of laminations having conductor slots therein, a plurality of lugs attached to said core and spaced concentrically around its periphery and extending longitudinally thereof, spaced concentric rings displaying tangential stiffness and radial flexibility attached in immovable relationship with said lugs, and a plurality of spaced axially extending bars firmly attached to the peripheral surface of said rings positioned between said rings and the inner surface of a frame for supporting the core in a fixed and immovable position so that vibrations appearing in the stator core as a result of deformation thereof are transmitted through said supports to the flexible members wherein the vibratory forces are dissipated.

4. A magnetic core for a dynamoelectric machine comprising a plurality of laminations having conductor receiving slots therein, a plurality of axially extending steel members spaced concentrically around said core and firmly attached thereto, a pair of spaced rings positioned at opposite ends of said core displaying tangential stiffness and radial flexibility welded to the outer surfaces of said members, and a plurality of axially extending bars positioned between said rings and the inner peripheral portion of a frame for spacing said core and said rings from the frame so that vibrations appearing in the stator core as a result of elliptical deformation thereof are transmitted through said supports to the flexible members wherein the vibratory forces are dissipated.

References Cited in the file of this patent

UNITED STATES PATENTS 1,784,643  Reist _____ Dec. 9, 1930